(12) United States Patent
Barnes, Jr.

(10) Patent No.: US 10,919,374 B2
(45) Date of Patent: *Feb. 16, 2021

(54) VEHICLE WINDSHIELD PROTECTION DEVICE

(71) Applicant: Delk, Inc., Nashville, TN (US)

(72) Inventor: Raymond Don Barnes, Jr., Nashville, TN (US)

(73) Assignee: Delk Industries, Inc., Nashville, TN (US)

(*) Notice: Subject to any disclaimer, the term of this patent is extended or adjusted under 35 U.S.C. 154(b) by 352 days.

This patent is subject to a terminal disclaimer.

(21) Appl. No.: 15/955,526

(22) Filed: Apr. 17, 2018

(65) Prior Publication Data
US 2018/0236860 A1    Aug. 23, 2018

Related U.S. Application Data

(63) Continuation-in-part of application No. 15/833,823, filed on Dec. 6, 2017, now Pat. No. 10,266,044, which is a continuation-in-part of application No. 15/594,403, filed on May 12, 2017, now Pat. No. 9,862,259, which is a continuation-in-part of application No. 14/185,125, filed on Feb. 20, 2014, now abandoned.

(51) Int. Cl.
*B60J 11/08*    (2006.01)

(52) U.S. Cl.
CPC ..................... *B60J 11/08* (2013.01)

(58) Field of Classification Search
CPC ....... B60J 11/08; B60J 13/0213; B60J 3/0213
USPC ....................... 150/168; 296/136.1
See application file for complete search history.

(56) References Cited

U.S. PATENT DOCUMENTS

| | | | |
|---|---|---|---|
| 2,223,145 A * | 11/1940 | Wise | B60J 11/08 160/329 |
| 5,292,167 A * | 3/1994 | Hellman | B60J 11/08 150/168 |
| 7,219,616 B2 * | 5/2007 | Pritchett | B63B 17/02 114/361 |
| 7,673,924 B1 * | 3/2010 | Lau | B60J 11/08 296/95.1 |
| 10,266,044 B2 * | 4/2019 | Barnes, Jr. | B60J 11/08 |
| 2004/0227373 A1 * | 11/2004 | Robbins | B60J 11/08 296/95.1 |
| 2009/0102230 A1 * | 4/2009 | Pehrson | B60J 11/08 296/136.13 |
| 2009/0261614 A1 * | 10/2009 | Haas | E05C 9/02 292/161 |

(Continued)

*Primary Examiner* — Sue A Weaver
(74) *Attorney, Agent, or Firm* — Kevin Schraven; Hankin Patent Law, APC

(57) ABSTRACT

A vehicle windshield protection device. The device may comprise: a cover portion and side mirror straps. The cover portion may comprise support members configured to prevent the vehicle windshield protection device from being blown off a vehicle. The cover portion may substantially cover an outer surface of a windshield of the vehicle. The side mirror straps may engage with one or more side mirrors of the vehicle. The wind strap may engage with a top portion of a vehicle and may prevent the device from being blown off the vehicle. The cover portion is generally configured to prevent frost, ice, and snow from adhering to the windshield and/or to prevent sunlight from coming through the windshield.

22 Claims, 6 Drawing Sheets

(56) References Cited

U.S. PATENT DOCUMENTS

| | | | |
|---|---|---|---|
| 2011/0109116 A1* | 5/2011 | Mitchell | B60J 11/08 296/95.1 |
| 2015/0114533 A1* | 4/2015 | Peries | B60J 11/08 150/168 |
| 2015/0151623 A1* | 6/2015 | Li | B60J 11/08 160/370.21 |

* cited by examiner

VEHICLE WINDSHIELD PROTECTION DEVICE

CROSS-REFERENCE TO RELATED APPLICATIONS

The Application is a continuation-in-part of U.S. Non-Provisional patent application Ser. No. 15/833,823, filed on Dec. 6, 2017, now U.S. Pat. No. 10,266,044, titled ""VEHICLE WINDSHIELD PROTECTION DEVICE", the contents of which are expressly incorporated herein by this reference, and to which priority is claimed. U.S. patent application Ser. No. 15/833,823 is a continuation-in-part of U.S. Non-Provisional patent application Ser. No. 15/594,403, now U.S. Pat. No. 9,862,259, titled "VEHICLE WINDSHIELD PROTECTION DEVICE", the contents of which are expressly incorporated herein by this reference, and to which priority is claimed. U.S. Non-Provisional patent application Ser. No. 15/594,403 is a continuation-in-part of U.S. Non-Provisional patent application Ser. No. 14/185,125, filed on Feb. 20, 2014, titled "VEHICLE WINDSHIELD PROTECTION DEVICE", the contents of which are expressly incorporated herein by this reference, and to which priority is claimed.

FIELD OF THE INVENTION

The present disclosure generally relates to devices for covering glass in order to protect the glass from the elements. More particularly, the present disclosure generally relates to a vehicle windshield cover that prevents sun, UV rays, ice, snow, and frost from covering or entering into the vehicles front windshield when the vehicle is not in use.

BACKGROUND OF THE INVENTION

Currently, several commercially available products are available for either (1) preventing sun or UV rays from entering through the windshield of a parked car, or (2) preventing ice, snow, and frost build-up on the windshield of a parked car. However, these products are deficient because: (1) they generally fail to securely stay in place during strong wind gusts; (2) they generally fail to cover the entire windshield; and (3) they are usually made from inferior materials.

Thus, what is needed is an improved windshield cover that fully and firmly covers the entire windshield of a vehicle to protect it from the elements.

SUMMARY OF THE INVENTION

To minimize the limitations in the prior art, and to minimize other limitations that will become apparent upon reading and understanding the present specification, the present disclosure discloses a new and useful vehicle windshield protection device.

The vehicle windshield protection device or cover may covers the outside of an entire windshield of the vast majority of vehicles, including trucks and SUVs. The device may be made from materials that safely and effectively protect the vehicle windshield or reflect sunlight away from the vehicle. The device is attached to the vehicle such that it may be firmly attached to a vehicle under strong winds, yet easily removed by the user.

One embodiment is an improved vehicle windshield protection device comprising: a cover portion; two sets of side mirror straps, comprising: a first full side strap; a second full side strap; a first mirror strap; a second mirror strap; a first horizontal strap; and second horizontal strap; two support members; wherein the cover portion comprises a top end, a bottom end, a first side, and a second side such that there is a first top corner, a second top corner, a first bottom corner, and a second bottom corner; wherein the cover portion substantially covers an outer surface of a windshield of a vehicle; wherein the two support members are located at the first side and the second side and keep the vehicle windshield protection device covering the windshield of the vehicle; wherein the two sets of mirror straps engage with two side mirrors of the vehicle; wherein the first full side strap extends between the first top corner and the first bottom corner; wherein the second full side strap extends between the second top corner and the second bottom corner; wherein the first mirror strap extends between the base of the first full side strap and a first full/mirror connection point; wherein the second mirror strap extends between the base of the second full side strap and a second full/mirror connection point; wherein a portion of the first full side strap that is between the base of the first full side strap and the first full/mirror connection point is longer than a length of the first mirror strap; wherein the first horizontal strap extends from the first side of the cover portion and connects to the first mirror strap; and wherein the second horizontal strap extends from the second side of the cover portion and connects to the second mirror strap. The device may further comprise one or more security side flaps; wherein the one or more security side flaps may each comprise a security side flap support member; wherein the one or more security side flaps may engage with an interior of the vehicle; wherein each of the one or more security side flap support members are may be connected at a distal end of each of one or more two security side flaps; and wherein the one or more security side flaps and the one or more security side flap support members may prevent the vehicle windshield protection device from being inadvertently removed from the vehicle. The cover portion may comprise an interior Polyvinyl Chloride coating; wherein the Polyvinyl Chloride coating may allow the cover portion to remain flexible in temperatures below 0° C.; and wherein the cover portion substantially prevents frost, ice, and snow from adhering to the windshield. The cover portion may also have an exterior reflective coating and substantially prevents sunlight from entering the vehicle through the windshield. The cover portion may also substantially cover one or more windshield wipers.

Another embodiment may be an improved vehicle windshield protection device comprising: a cover portion; two sets of side mirror straps comprising a first set of side mirror straps and a second set of side mirror straps, each set comprising a vertical top strap, a middle strap, a horizontal base strap, a horizontal middle strap, a top connector strap, and a bottom connector strap, such that there is a first and second vertical top strap, a first and second middle strap, a first and second horizontal base strap, a first and second horizontal middle strap, a first and second top connector strap, and a first and second bottom connector strap; two support members; wherein the cover portion comprises a top end, a bottom end, a first side, and a second side such that there is a first top corner, a second top corner, a first bottom corner, and a second bottom corner; wherein the cover portion substantially covers an outer surface of a windshield of a vehicle; wherein the two support members are located at the first side and the second side and keep the vehicle windshield protection device covering the windshield of the vehicle; and wherein the two sets of mirror straps engage with two side mirrors of the vehicle. The first vertical top strap, the first top connector strap, the first horizontal base strap, and the first bottom connector strap may form a first mid-mirror strap that extends substantially from the first top corner of the cover portion to the first bottom corner of the cover portion; wherein the second vertical top strap, the second top connector strap, the second horizontal base strap, and second bottom connector strap form a second mid-mirror strap that extends substantially from the second top corner of the cover portion to the second bottom corner of the cover portion; wherein the first horizontal middle strap connects to the first mid-mirror strap where the first top connector strap meets the first bottom connector strap and connects to the cover strap at a point above the first bottom corner; wherein the second horizontal middle strap connects to the second mid-mirror strap where the second top connector strap meets the second bottom connector strap and connects to the cover strap at a point above the second bottom corner; wherein a top end of the first middle strap connects to the first mid-mirror strap above where the first horizontal middle strap connects to the first mid-mirror strap; wherein a bottom end of the first middle strap connects to the first mid-mirror strap where the first bottom connector strap meets the first horizontal base strap; and wherein a bottom end of the second middle strap connects to the second mid-mirror strap where the second bottom connector strap meets the second horizontal base strap. The vehicle windshield protection device may further comprising: two full side straps; one or more security side flaps; wherein the one or more security side flaps each comprise a security side flap support member; wherein the one or more security side flaps engage with an interior of the vehicle; wherein each of the one or more security side flap support members are connected at a distal end of each of one or more two security side flaps; and wherein the one or more security side flaps and the one or more security side flap support members prevent the vehicle windshield protection device from being inadvertently removed from the vehicle. The cover portion may comprise an interior Polyvinyl Chloride coating; wherein the Polyvinyl Chloride coating makes the cover portion remain flexible in temperatures below 0° C.; wherein the cover portion substantially prevents frost, ice, and snow from adhering to the windshield. The cover portion may have an exterior reflective coating and substantially prevents sunlight from entering the vehicle through the windshield. The cover portion may also substantially cover the one or more windshield wipers.

Another embodiment may be an improved vehicle windshield protection device comprising: a cover portion; two sets of side mirror straps comprising a first set of side mirror straps and a second set of side mirror straps, each set comprising a vertical mirror strap and two horizontal straps, a top horizontal strap and a bottom horizontal strap, such that there is a first and second vertical mirror strap, a first and second top horizontal strap, and a first and second bottom horizontal strap; two support members; wherein the cover portion comprises a top end, a bottom end, a first side, and a second side such that there is a first top corner, a second top corner, a first bottom corner, and a second bottom corner; wherein the cover portion substantially covers an outer surface of a windshield of a vehicle; wherein the two support members are located at the first side and the second side and keep the vehicle windshield protection device covering the windshield of the vehicle; and wherein the two sets of mirror straps engage with two side mirrors of the vehicle. The first vertical strap may extend substantially from the first top corner of the cover portion to the first bottom corner of the cover portion; wherein the second vertical strap extends substantially from the second top corner of the cover portion to the second bottom corner of the cover portion; wherein the first top horizontal strap and the first bottom horizontal are substantially parallel to each other, with the first top horizontal strap above the first bottom horizontal strap; wherein the second top horizontal strap and the second bottom horizontal are substantially parallel to each other, with the second top horizontal strap above the second bottom horizontal strap; wherein the first top horizontal strap and the first bottom horizontal strap extend substantially in a horizontal manner from the first side to the first vertical strap; and wherein the second top horizontal strap and the second bottom horizontal strap extend substantially in a horizontal manner from the second side to the second vertical strap. The vehicle windshield protection device may further comprising: two full side straps; and one or more security side flaps; wherein the one or more security side flaps each comprise a security side flap support member; wherein the one or more security side flaps engage with an interior of the vehicle; wherein each of the one or more security side flap support members are connected at a distal end of each of one or more two security side flaps; and wherein the one or more security side flaps and the one or more security side flap support members prevent the vehicle windshield protection device from being inadvertently removed from the vehicle. The cover portion may comprise an interior Polyvinyl Chloride coating; wherein the Polyvinyl Chloride coating makes the cover portion remain flexible in temperatures below 0° C.; wherein the cover portion substantially prevents frost, ice, and snow from adhering to the windshield. The cover portion has an exterior reflective coating and substantially prevents sunlight from entering the vehicle through the windshield. The cover portion may also substantially cover the one or more windshield wipers.

These, as well as other components, steps, features, objects, benefits, and advantages, will now become clear from a review of the following detailed description of illustrative embodiments, the accompanying drawings, and the claims.

BRIEF DESCRIPTION OF THE DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps which are illustrated. When the same numeral appears in different drawings, it refers to the same or like components or steps.

DETAILED DESCRIPTION OF THE DRAWINGS

Figure 1:
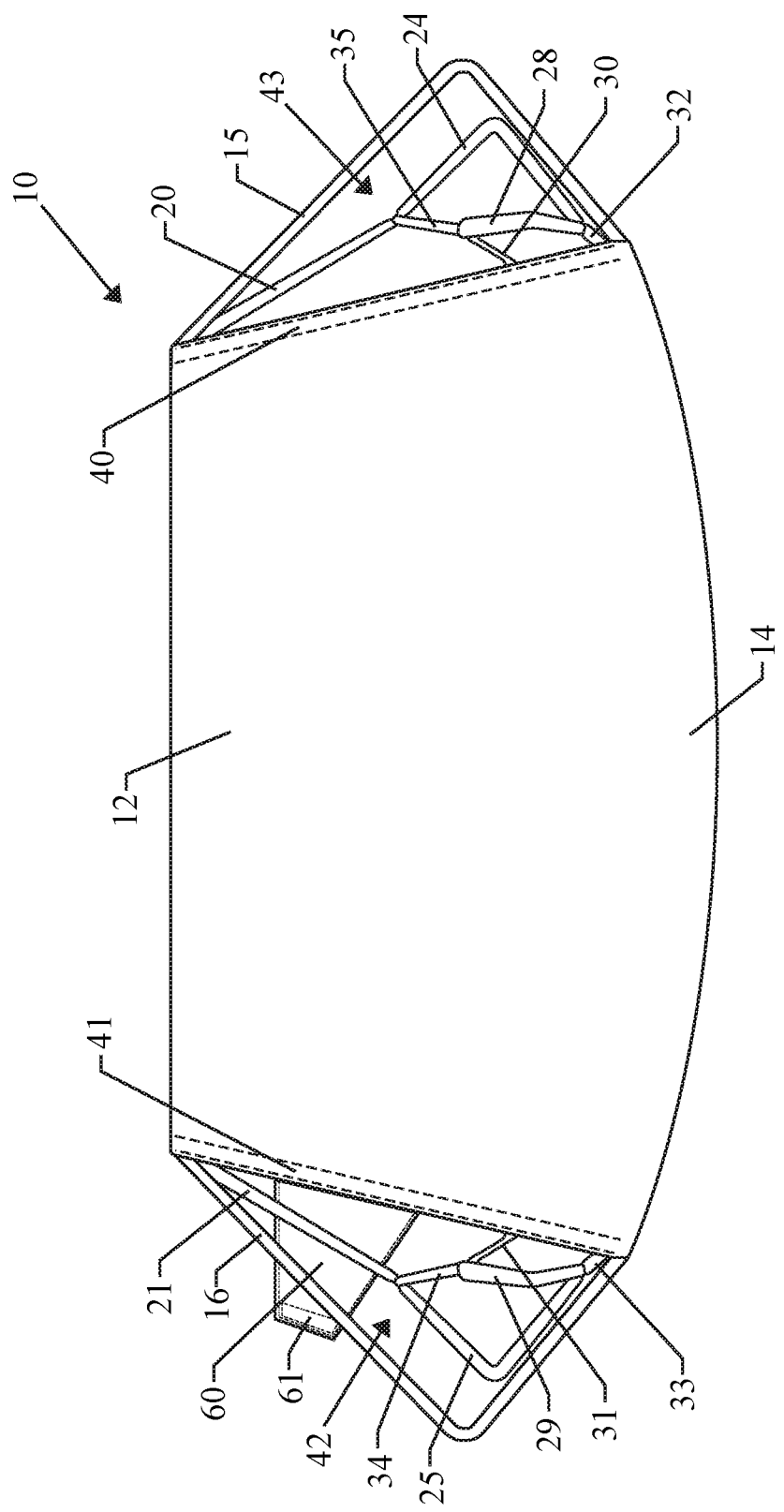
FIG. 1 is an illustration of a front view of one embodiment of the vehicle windshield protection device.

In the following detailed description of various embodiments of the invention, numerous specific details are set forth in order to provide a thorough understanding of various aspects of one or more embodiments of the invention. However, one or more embodiments of the invention may be practiced without some or all of these specific details. In other instances, well-known methods, procedures, and/or components have not been described in detail so as not to unnecessarily obscure aspects of embodiments of the invention.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the figures, and the detailed descriptions thereof, are to be regarded as illustrative in nature and not restrictive. Also, the reference or non-reference to a particular embodiment of the invention shall not be interpreted to limit the scope of the invention.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

In the following description, certain terminology is used to describe certain features of one or more embodiments. For purposes of the specification, unless otherwise specified, the term "substantially" refers to the complete or nearly complete extent or degree of an action, characteristic, property, state, structure, item, or result. For example, in one embodiment, an object that is "substantially" located within a housing would mean that the object is either completely within a housing or nearly completely within a housing. The exact allowable degree of deviation from absolute completeness may in some cases depend on the specific context. However, generally speaking, the nearness of completion will be so as to have the same overall result as if absolute and total completion were obtained. The use of "substantially" is also equally applicable when used in a negative connotation to refer to the complete or near complete lack of an action, characteristic, property, state, structure, item, or result.

As used herein, the terms "approximately" and "about" generally refer to a deviance of within 5% of the indicated number or range of numbers. In one embodiment, the term "approximately" and "about", may refer to a deviance of between 0.001-10% from the indicated number or range of numbers.

FIG. 1 is an illustration of a view of one embodiment of the vehicle windshield protection device. As shown in FIG. 1, the vehicle windshield protection device 10 may comprise: a cover portion 12, security side flap 60 (also shown in FIG. 5), support members 40, 41, security side flap support member 61 (shown in FIG. 5), full side straps 15, 16, mirror straps 42, 43. As shown, the cover portion 12 may be configured to substantially cover an outer surface of a windshield of a vehicle. The cover portion 12, which is shown as a single piece in FIG. 1, may be more than one piece. The purpose of the cover portion 12 is to substantially prevent frost, ice, and snow from adhering to the windshield. The cover portion 12 is most effective at preventing ice or frost build up when it maintains direct contact with the glass of the windshield. In order to do this, the cover portion 12 is held firmly in place by a series of straps, including, full side straps 15, 16 and mirror straps 42, 43. The straps may be configured to engage with one or more side mirrors of a vehicle. In this manner, the device 10 may removably connect to the vehicle and may be held firmly and securely in place. The straps are preferably made from high grade elastic that allows them to returnably stretch and hook around the side mirrors or other vehicle parts while holding the cover portion 12 taut. In a preferred embodiment, the elastic straps may withstand low and high temperatures and repeated donning and removal. In one embodiment the straps may be made from polypropylene yarn.

The security flap 60 may be configured to pass through the interior of a vehicle and prevent the vehicle windshield protection device 10 from being blown off the vehicle. The security flap 60 may also prevent the vehicle windshield protection device 10 from being stolen from the vehicle. The security flap 60 may be removably attached to the cover portion 10, but they are preferably permanently and very securely attached. The security flap 60 may be folded into the vehicle when the vehicle door is open, and then the vehicle door may completely close, trapping and physically securing the security flap 60 partially inside the vehicle. The support member 61, in this manner, is inside the vehicle, and may be rigid rod or other dowel type structure that prevents the security flap 60 from being pulled out of the car when the door is shut.

As shown in FIG. 1, the support members 40, 41, which may be a rigid rod or other dowel type structure, may provide side support to the cover portion 12. The support members 40, 41, may preferably be made from any synthetic or semi-synthetic material, such as plastic or composite. They may also be wood or treated wood. The support members 40, 41 may preferably extend along both sides of the cover portion. In some embodiments, only one support member is present.

The device 10 may also include a windshield wiper flap portion 14, which may substantially prevent frost, ice, and snow from adhering to one or more windshield wipers. As shown in FIG. 1, the windshield wiper flap portion 14 may be rounded bottom of cover portion 12.

The cover portion 12 and/or the windshield wiper flap portion 14 may comprise a Polyvinyl Chloride (PVC) coating. The PVC coating may generally help the cover portion 12 and/or windshield wiper flap portion 14 remain flexible in temperatures below 0° C. and generally make the cover portion 12 extremely durable and water resistant. The PVC coating may sometimes only be on an interior surface of the cover portion 12, such that the PVC coating directly contacts the vehicle windshield. The cover portion 12 may be made from one or more layers of a durable, weather resistant material such as canvas, which may then be coated with the PVC coating.

FIG. 1 also shows how the straps may each comprise full side straps 15, 16 and mirror straps 42, 43. As shown, each side mirror strap 42, 43 may comprise three to six straps that are configured to engage with the side mirrors of the vehicle. The side mirror straps 42, 43 may comprise a vertical top strap 20, 21, a middle strap 24, 25, a horizontal base strap 32, 33, a horizontal middle strap 30, 31, and top connector strap 34, 35, and bottom connector strap 28, 29.

In one embodiment, the vertical top strap 20, 21, top connector strap 34, 35, bottom connector strap 28, 29, and horizontal base strap 32, 33 are all one mid-mirror strap that extends from just below the top connection point of full strap 15, 16 to just above the bottom connection point of full strap 15, 16. In this embodiment, the top end of the middle strap 24, 25 connects to the mid-mirror strap just above the top end of the horizontal middle strap 30, 31 and the bottom end of the middle strap 24, 25 connects to the mid-mirror strap just below the top end of the horizontal middle strap 30, 31. The bottom or proximal end of the horizontal middle strap 30, 31 is connected to the cover portion 12 or the support members 40, 41, at a point above the bottom connection point of the mid-mirror strap.

In other embodiments, the mirror straps 42, 43 have a similar configuration, but the way which the straps interconnect may be different and a different number of straps may be connected, usually by sewing, heat fusing, or ultrasonic welding.

In another embodiment device 10 may be configured to protect the vehicle from sun damage caused by solar rays. This embodiment may be in addition to, or instead of, protecting the windshield from snow and ice. In this embodiment, the cover portion 12 and or wiper portion 14 may have a reflective coating on an exterior instead of/or addition to the Polyvinyl Chloride (PVC) coating that is usually on the interior side of the device 10. If the device 10 is configured to protect the vehicle from the sun, then the cover portion 12 may be a lightweight, single layer of polyester, instead of a PVC coated canvas. The reflective coating may be silver, gold, blue, gray, or some other color that assists in reflecting light away from the vehicle windshield.

Figure 2:
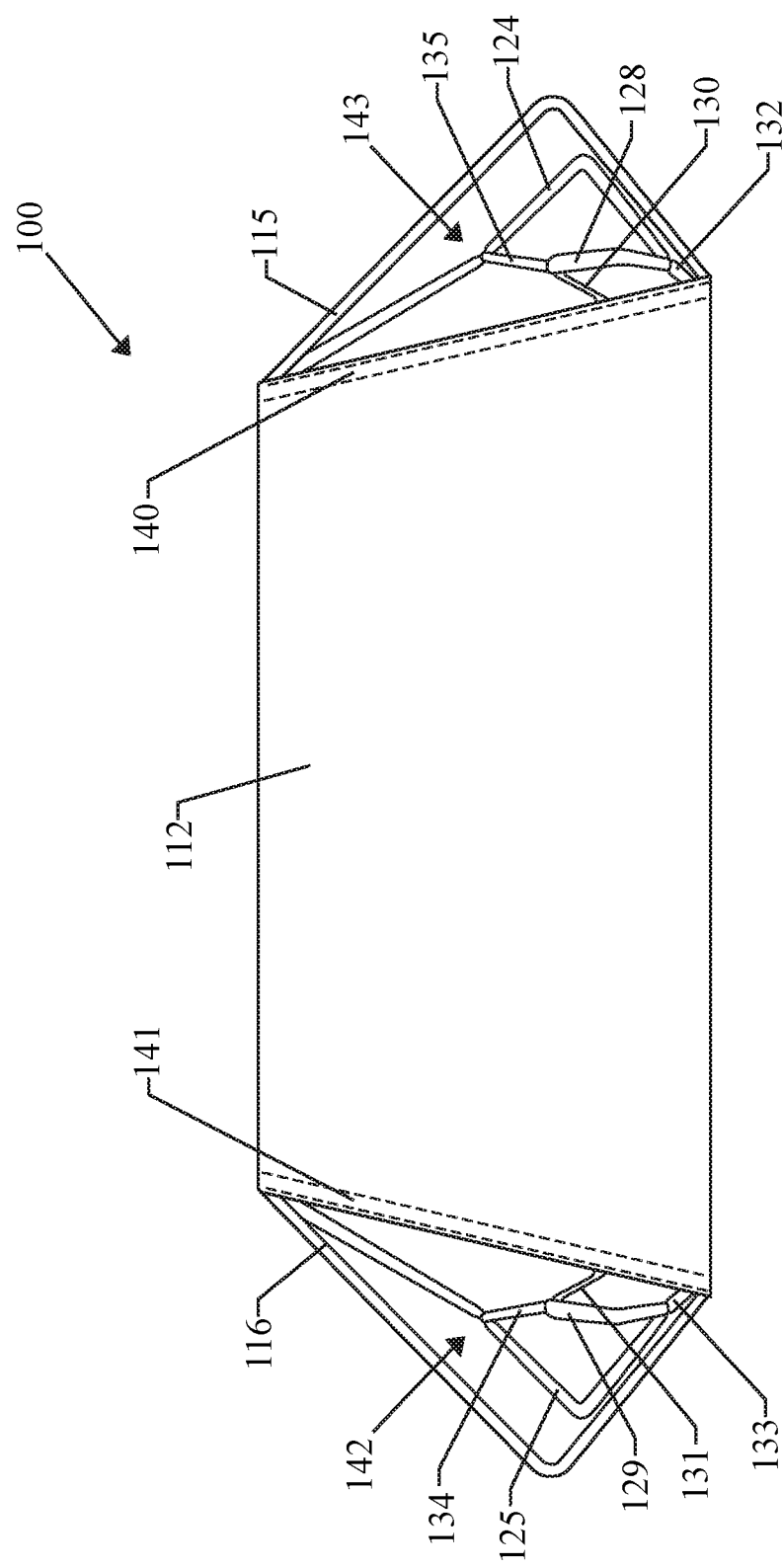
FIG. 2 is an illustration of a front view of another embodiment of the vehicle windshield protection device.

The use of an exterior reflective windshield protective device 10 provides much better protection from heat and solar rays than nothing or an interior pop-up FIG. 2 is an illustration of a view of another embodiment of the vehicle windshield protection device. As shown in FIG. 2, the vehicle windshield protection device 100 may comprise: a cover portion 112, security side flaps (shown in FIGS. 5 and 6), support members 140, 141, security side flap support members (shown in FIGS. 5 and 6), full side straps 115, 116, mirror straps 142, 143\. As shown, the cover portion 112 may be configured to substantially cover an outer surface of a windshield of a vehicle. The cover portion 112, which is shown as a single piece in FIG. 2, may be more than one piece. The purpose of the cover portion 112 is to substantially prevent frost, ice, and snow from adhering to the windshield. The cover portion 112 is most effective at preventing ice or frost build up when it maintains direct contact with the glass of the windshield. In order to do this, the cover portion 112 is held firmly in place by a series of straps, including, full side straps 115, 116 and mirror straps 142, 143. The straps may be configured to engage with one or more side mirrors of a vehicle. In this manner, the device 100 may removably connect to the vehicle and may be held firmly and securely in place. The straps are preferably made from high grade elastic that allows them to returnably stretch and hook around the side mirrors or other vehicle parts while holding the cover portion 112 taut. In a preferred embodiment, the elastic straps may withstand low and high temperatures and repeated donning and removal.

As shown in FIG. 2, the support members 140, 141, which may be a rigid rod or other dowel type structure, may provide side support to the cover portion 12. The support members 140, 141, may preferably be made from any synthetic or semi-synthetic material, such as plastic or composite. They may also be wood or treated wood. The support members 140, 141 may preferably extend along both sides of the cover portion. In some embodiments, only one support member is present.

The cover portion 112 may comprise a Polyvinyl Chloride (PVC) coating. The PVC coating may generally help the cover portion 112 remain flexible in temperatures below 0° C. and generally make the cover portion 112 extremely durable and water resistant. The PVC coating may sometimes only be on an interior surface of the cover portion 112, such that the PVC coating directly contacts the vehicle windshield. The cover portion 112 may be made from one or more layers of a durable, weather resistant material such as canvas, which may then be coated with the PVC coating. This this embodiment, the windshield is covered but the wipers are not specifically covered by an extra flap.

FIG. 2 also shows how the straps may each comprise full side straps 115, 116 and mirror straps 142, 143. As shown, each side mirror strap 142, 143 may comprise three to six straps that are configured to engage with the side mirrors of the vehicle. The side mirror straps 142, 143 may comprise a vertical top strap 120, 121, a middle strap 124, 125, a horizontal base strap 132, 133, a horizontal middle strap 130, 131, and top connector strap 134, 135, and bottom connector strap 128, 129.

In one embodiment, the vertical top strap 120, 121, top connector strap 134, 135, bottom connector strap 128, 129, and horizontal base strap 132, 133 are all one mid-mirror strap that extends from just below the top connection point of full strap 115, 116 to just above the bottom connection point of full strap 115, 116. In this embodiment, the top end of the middle strap 124, 125 connects to the mid-mirror strap just above the top end of the horizontal middle strap 130, 131 and the bottom end of the middle strap 124, 125 connects to the mid-mirror strap just below the top end of the horizontal middle strap 130, 131. The bottom or proximal end of the horizontal middle strap 130, 131 is connected to the cover portion 112 or the support members 140, 141, at a point above the bottom connection point of the mid-mirror strap.

In other embodiments, the mirror straps 142, 143 have a similar configuration, but the way which the straps interconnect may be different and a different number of straps may be connected, usually by sewing, heat fusing, or ultrasonic welding.

Figure 3:
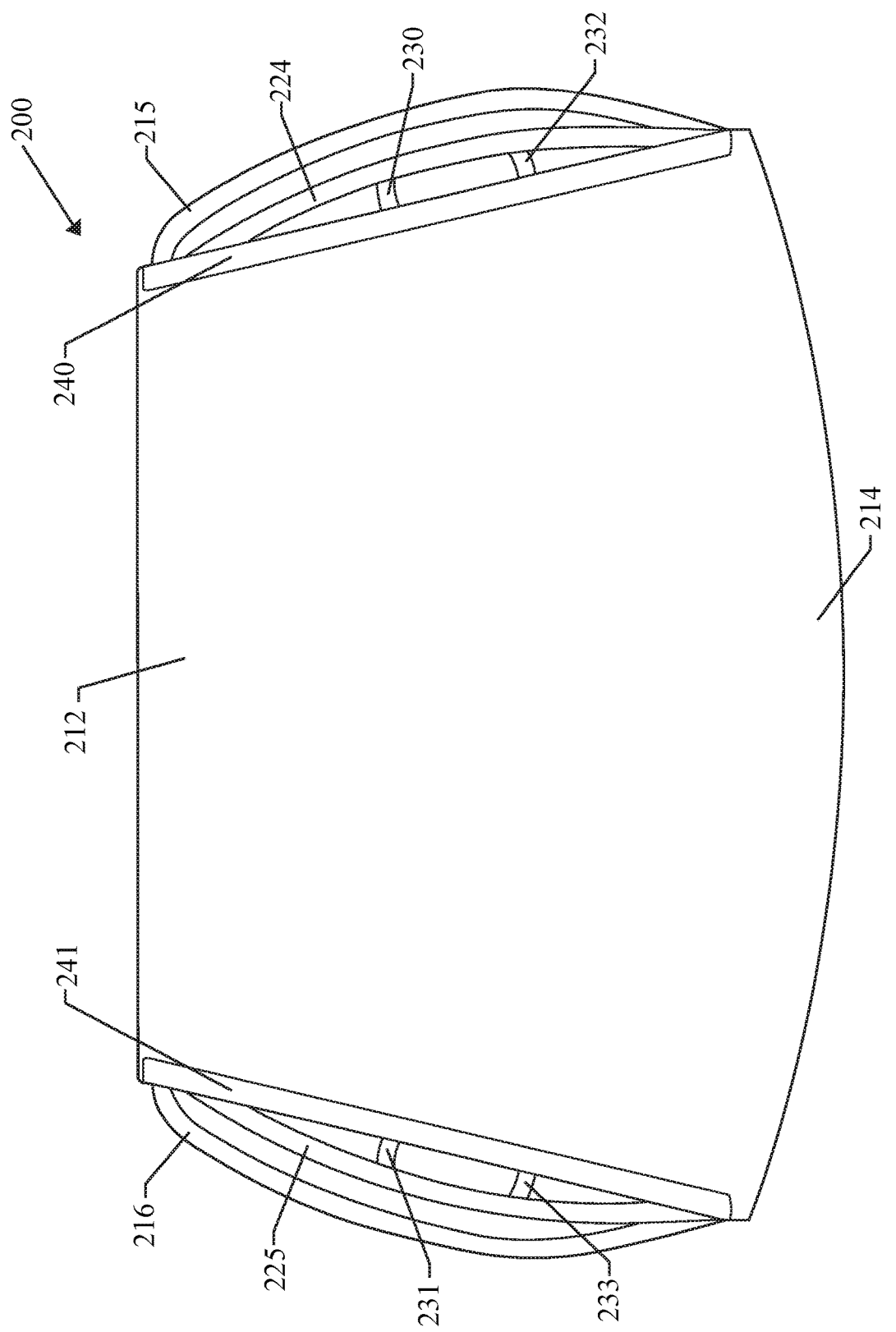
FIG. 3 is an illustration of a front view of another embodiment of the vehicle windshield protection device.

FIG. 3 is an illustration of a view of another embodiment of the vehicle windshield protection device. As shown in FIG. 3, the vehicle windshield protection device 200 may comprise: a cover portion 212, security side flaps (shown in FIGS. 1 and 5), support members 240, 241, security side flap support members (shown in FIGS. 1 and 5), full side straps 215, 216, vertical mirror straps 224, 225, and horizontal straps 230, 231, 232, 233. As shown, the cover portion 212 may be configured to substantially cover an outer surface of a windshield of a vehicle. The cover portion 212, which is shown as a single piece in FIG. 3, may be more than one piece. The purpose of the cover portion 212 is to substantially prevent frost, ice, and snow from adhering to the windshield. The cover portion 212 is most effective at preventing ice or frost build up when it maintains direct contact with the glass of the windshield. In order to do this, the cover portion 212 is held firmly in place by a series of straps, including, full side straps 215, 216, vertical mirror straps 224, 225, and horizontal straps 230, 231, 232, 233. The straps may be configured to engage with one or more side mirrors of a vehicle. In this manner, the device 200 may removably connect to the vehicle and may be held firmly and securely in place. The straps are preferably made from high grade elastic that allows them to returnably stretch and hook around the side mirrors or other vehicle parts while holding the cover portion 212 taut. In a preferred embodiment, the elastic straps may withstand low and high temperatures and repeated donning and removal.

As shown in FIG. 3, the support members 240, 241, which may be a rigid rod or other dowel type structure, may provide side support to the cover portion 212. The support members 240, 241, may preferably be made from any synthetic or semi-synthetic material, such as plastic or composite. They may also be wood or treated wood. The support members 240, 241 may preferably extend along both sides of the cover portion. In some embodiments, only one support member is present.

The device 200 may also include a windshield wiper flap portion 214, which may substantially prevent frost, ice, and snow from adhering to one or more windshield wipers. As shown in FIG. 3, the windshield wiper flap portion 214 may be rounded bottom of cover portion 212.

The cover portion 212 may comprise a Polyvinyl Chloride (PVC) coating. The PVC coating may generally help the cover portion 212 remain flexible in temperatures below 0° C. and generally make the cover portion 212 extremely durable and water resistant. The PVC coating may sometimes only be on an interior surface of the cover portion 212, such that the PVC coating directly contacts the vehicle windshield. The cover portion 212 may be made from one or more layers of a durable, weather resistant material such as canvas, which may then be coated with the PVC coating. This this embodiment, the windshield is covered but the wipers are not specifically covered by an extra flap.

FIG. 3 also shows how the straps may each comprise full side straps 215, 216, vertical mirror straps 224, 225, and horizontal straps 230, 231, 232, 233. The vertical mirror straps 224, 225 preferably extend substantially from the top of the cover portion 212 to the bottom of the cover portions 212. The ends may be connected in the same location as the full side straps or just proximal. As shown, preferably each side of the cover portion 212 has two horizontal straps 230, 231, 232, 233. In this case straps 231 and 233 are on the left side and extend horizontally from the side of the cover portion 212 and are attached to vertical mirror strap 235. Preferably the two horizontal mirror straps are parallel or substantially parallel to each other. As shown in FIG. 3, the lower horizontal strap 233 is about ⅓ the way up the length of the side of the cover portion 212, and upper horizontal strap 231 is just over ½ the way up the length of the side of the cover portion 212.

Figure 4:
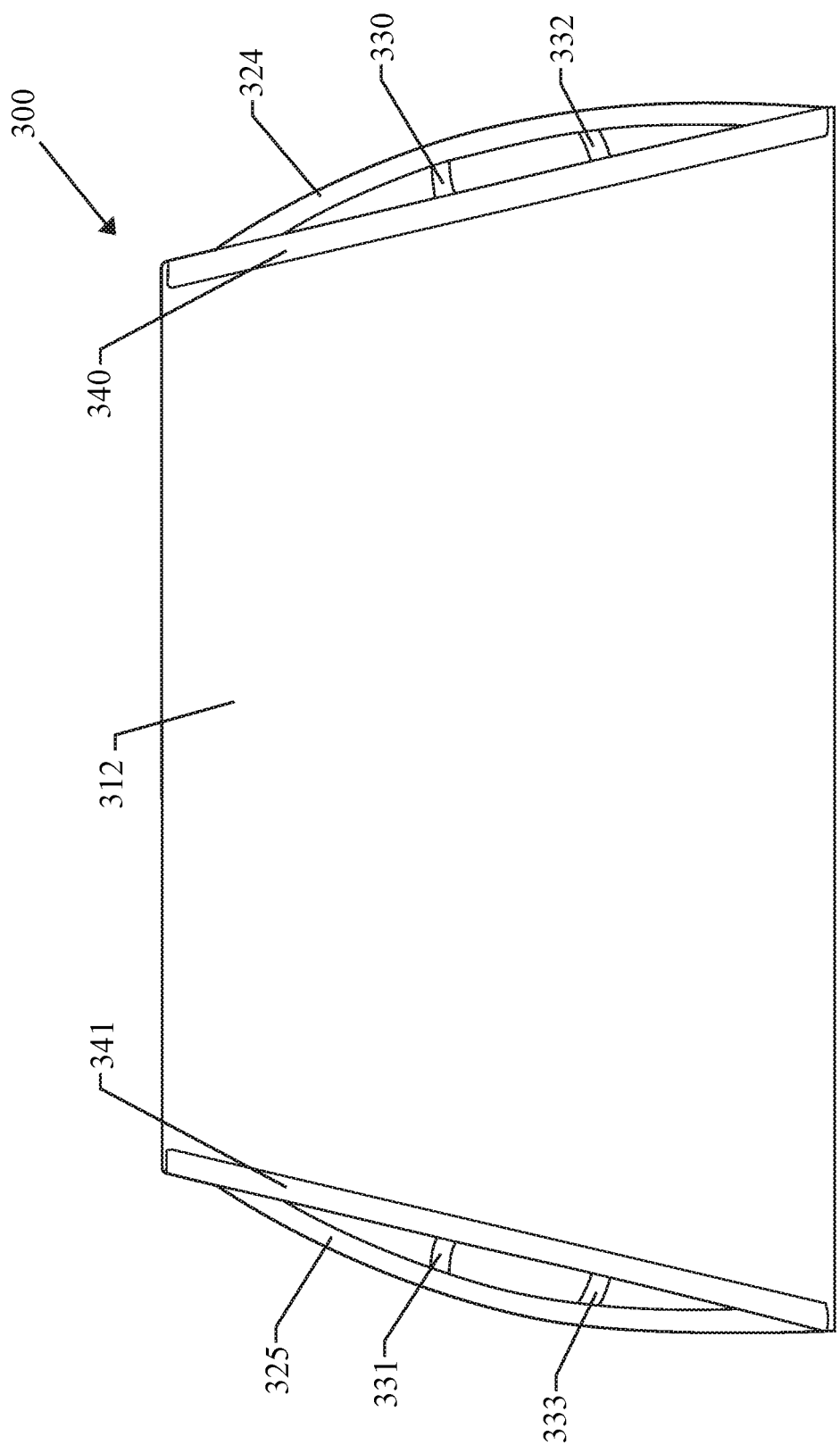
FIG. 4 is an illustration of a front view of another embodiment of the vehicle windshield protection device.

FIG. 4 is an illustration of a view of another embodiment of the vehicle windshield protection device. As shown in FIG. 4, the vehicle windshield protection device 300 may comprise: a cover portion 312, security side flaps (shown in FIGS. 1 and 5), support members 340, 341, security side flap support members (shown in FIGS. 1 and 5), vertical mirror straps 324, 325, and horizontal straps 330, 331, 332, 333. As shown, the cover portion 312 may be configured to substantially cover an outer surface of a windshield of a vehicle. The cover portion 312, which is shown as a single piece in FIG. 3, may be more than one piece. The purpose of the cover portion 312 is to substantially prevent frost, ice, and snow from adhering to the windshield. The cover portion 312 is most effective at preventing ice or frost build up when it maintains direct contact with the glass of the windshield. In order to do this, the cover portion 312 is held firmly in place by a series of straps, including vertical mirror straps 324, 325, and horizontal straps 330, 331, 332, 333. The straps may be configured to engage with one or more side mirrors of a vehicle. In this manner, the device 300 may removably connect to the vehicle and may be held firmly and securely in place. The straps are preferably made from high grade elastic that allows them to returnably stretch and hook around the side mirrors or other vehicle parts while holding the cover portion 312 taut. In a preferred embodiment, the elastic straps may withstand low and high temperatures and repeated donning and removal.

As shown in FIG. 3, the support members 340, 341, which may be a rigid rod or other dowel type structure, may provide side support to the cover portion 312. The support members 340, 341, may preferably be made from any synthetic or semi-synthetic material, such as plastic or composite. They may also be wood or treated wood. The support members 340, 341 may preferably extend along both sides of the cover portion. In some embodiments, only one support member is present.

The device 300 preferably does not include a windshield wiper flap portion.

The cover portion 312 may comprise a Polyvinyl Chloride (PVC) coating. The PVC coating may generally help the cover portion 312 remain flexible in temperatures below 0° C. and generally make the cover portion 312 extremely durable and water resistant. The PVC coating may sometimes only be on an interior surface of the cover portion 312, such that the PVC coating directly contacts the vehicle windshield. The cover portion 312 may be made from one or more layers of a durable, weather resistant material such as canvas, which may then be coated with the PVC coating. This this embodiment, the windshield is covered but the wipers are not specifically covered by an extra flap.

FIG. 3 also shows how the straps may each comprise vertical mirror straps 324, 325 and horizontal straps 330, 331, 332, 333. The vertical mirror straps preferably extend substantially from the top of the cover portion to the bottom of the cover portions. The ends may be connected in the same location as the full side straps or just proximal. As shown, preferably each side of the cover portion 312 has two horizontal straps 330, 331, 332, 333. In this case straps 331 and 333 are on the left side and extend horizontally from the side of the cover portion 312 and are attached to vertical mirror strap 335. Preferably the two horizontal mirror straps are parallel or substantially parallel to each other. As shown in FIG. 3, the lower horizontal strap 333 is about ⅓ the way up the length of the side of the cover portion 312, and upper horizontal strap 331 is just over ½ the way up the length of the side of the cover portion 312.

Figure 5:
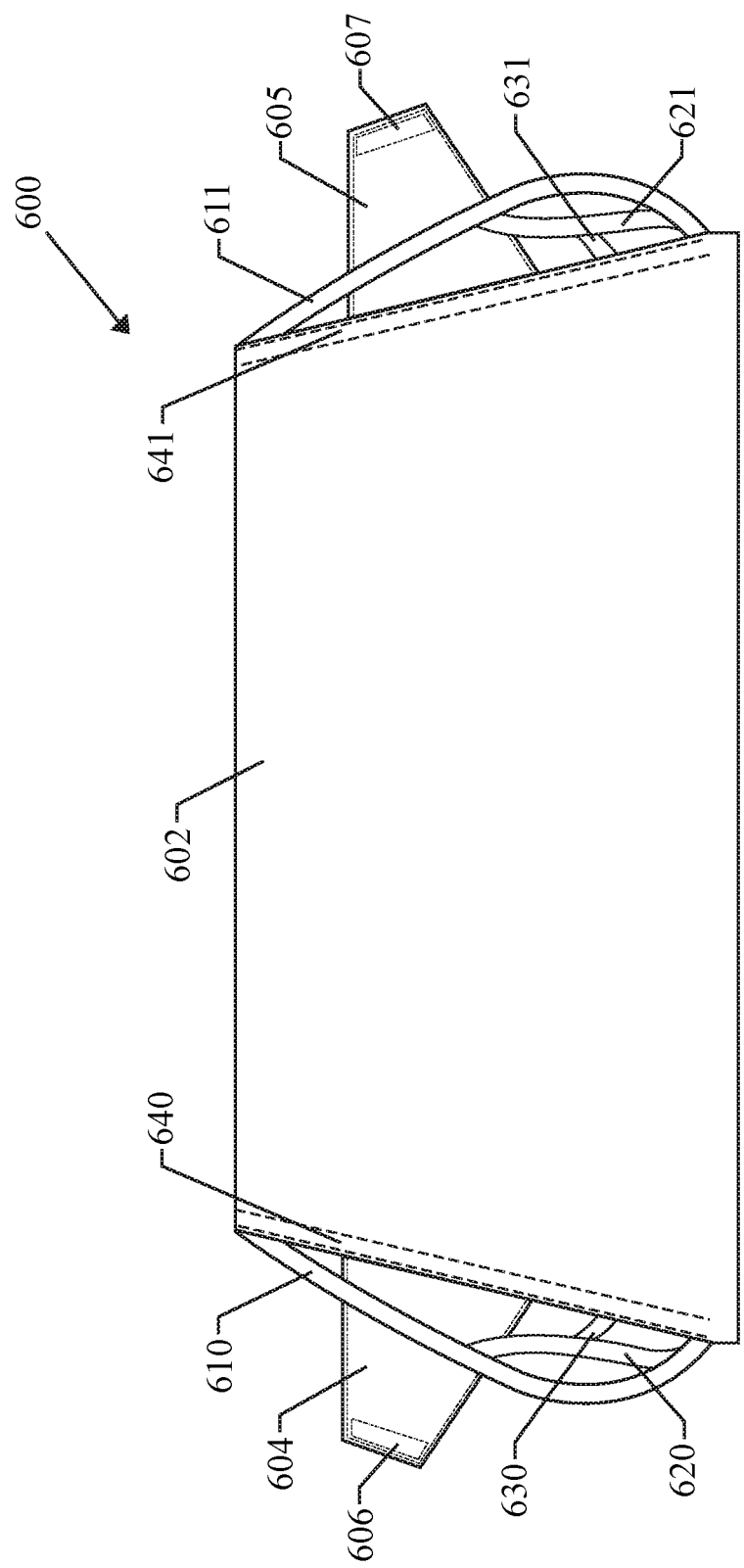
FIG. 5 is an illustration of a front view of another embodiment of the vehicle windshield protection device.

FIG. 5 is an illustration of a view of another embodiment of the vehicle windshield protection device showing side flaps and straps. As shown in FIG. 5, the vehicle windshield protection device 600 may comprise: a cover portion 602, security side flaps 604, 605, support members 640, 641, security side flap support members 606, 607, full side straps 610, 611, mirror straps 620, 621, and horizontal straps 630, 631. As shown, the cover portion 602 may be configured to substantially cover an outer surface of a windshield of a vehicle. The cover portion 602, which is shown as a single piece in FIG. 5, may be more than one piece. The purpose of the cover portion 602 is to substantially prevent frost, ice, and snow from adhering to the windshield. The cover portion 602 is most effective at preventing ice or frost build up when it maintains direct contact with the glass of the windshield. In order to do this, the cover portion 602 is held firmly in place by a series of straps, including, full side straps 610, 611, mirror straps 620, 621, and horizontal straps 630, 631, security side flaps 604, 605, and support members 640, 641. The straps may be configured to engage with one or more side mirrors of a vehicle. In this manner, the device 600 may removably connect to the vehicle and may be held firmly and securely in place. The straps are preferably made from high grade elastic that allows them to returnably stretch and hook around the side mirrors or other vehicle parts while holding the cover portion 602 taut. In a preferred embodiment, the elastic can withstand low and high temperatures and repeated donning and removal.

The security flaps 604, 605 may be configured to pass through the interior of a vehicle and prevent the vehicle windshield protection device 600 from being blown off the vehicle. The security flaps 604, 605 may also prevent the vehicle windshield protection device 600 from being stolen from the vehicle. The security flaps 604, 505 may be removably attached to the cover portion 602, but they are preferably permanently and very securely attached. The security flaps 604, 605 may be folded into the vehicle when the vehicle door is open, and then the vehicle door may completely close, trapping and physically securing the security flaps 604, 605 partially inside the vehicle. The support members 606, 607, in this manner, are inside the vehicle, and may be rigid rods or other dowel type structure that prevents the security flaps 604, 605 from being pulled out of the car when the door is shut.

As shown in FIG. 5, the support members 640, 641, which may be a rigid rod or other dowel type structure, may provide side support to the cover portion 602. The support members 640, 641, may preferably be made from any synthetic or semi-synthetic material. The support members 640, 641 may preferably extend along both sides of the cover portion.

The device 600 preferably does not include a windshield wiper flap portion.

The cover portion 602 may comprise a Polyvinyl Chloride (PVC) coating. The PVC coating may generally help the cover portion 602 may remain flexible in temperatures below 0° C. and generally make the cover portion 605 extremely durable and water resistant. The PVC coating may be on an interior surface of the cover portion 602, such that the PVC coating directly contacts the vehicle windshield. The cover portion 602 may be made from one or more layers of a durable, weather resistant material such as canvas, which may then be coated with the PVC coating.

FIG. 5 also shows how the straps may each comprise full side straps 610, 611, mirror straps 620, 621, and horizontal straps 630, 631. As shown, mirror straps 620, 621 may extend between a base of the full side strap 610, 611 and a full/mirror connection point, which may be higher up on the full side straps 610, 611 such that the portions of the full side straps 610, 611 that are between the base of the full side strap 610, 611 and the full/mirror connection point are longer than the length of the mirror straps 620, 621, Horizontal straps 630, 631 preferably extend from a side of the cover portion 602 and connect to the mirror straps 620, 621. This configuration allows the user to fit the side straps onto a wide variety of cars from small cars to large trucks.

In another embodiment device 10, 100, 200, 300, 600 may be configured to protect the vehicle from sun damage caused by solar rays. This embodiment may be in addition to, or instead of, protecting the windshield from snow and ice. In this embodiment, the cover portion 12, 112, 212, 312, 602 and or wiper portion 14, 214 may have a reflective coating on an exterior instead of/or addition to the Polyvinyl Chloride (PVC) coating that is usually on the interior side of the device 10, 100, 200, 300, 600. If the device 10, 100, 200, 300, 600 is configured to protect the vehicle from the sun, then the cover portion 12, 112, 212, 312, 602 may be a lightweight, single layer of polyester, instead of a PVC coated canvas. The reflective coating may be silver, gold, blue, gray, or some other color that assists in reflecting light away from the vehicle windshield.

Figure 6:
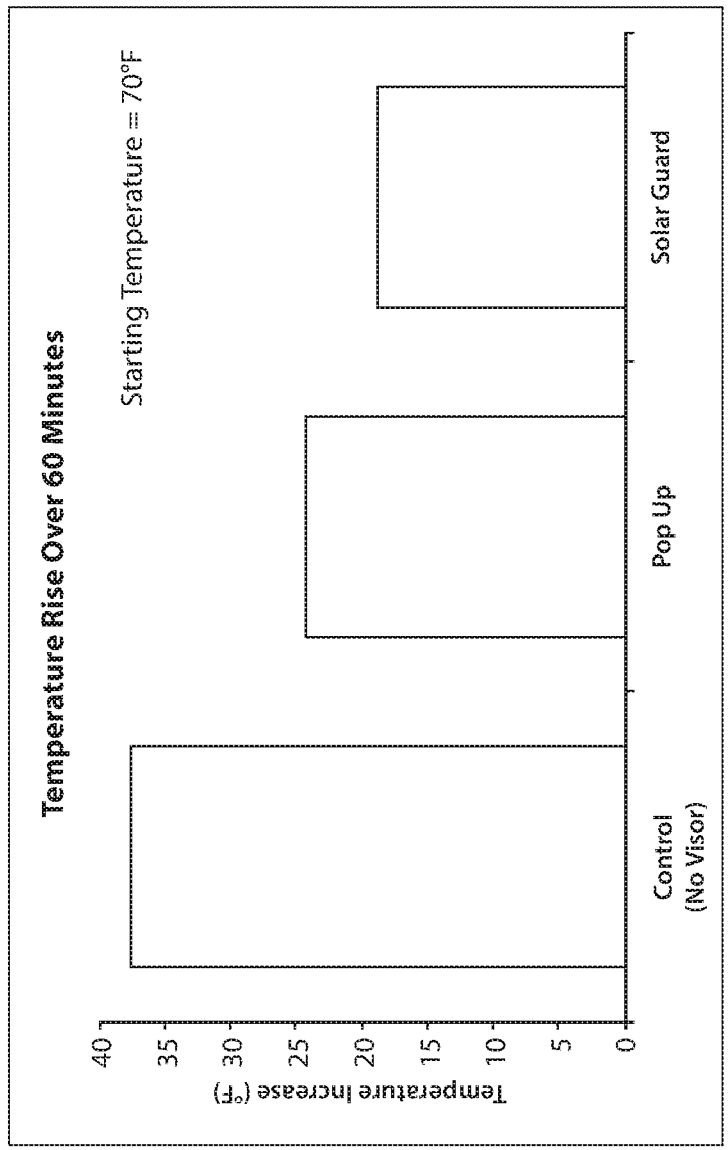
FIG. 6 is a graph showing that the reflective vehicle windshield protection device is much more effective than a pop-up reflector.

FIG. 6 is a graph showing that the reflective vehicle windshield protection device is much more effective than a pop-up reflector. As shown in FIG. 6, the use of the exterior reflective windshield protective device 10, 100, 200, 300, 600 provides much better protection from heat and solar rays than nothing or an interior pop-up reflector. Experiments specifically show that the temperature rise inside of the vehicle went up 20% less than with the standard pop-up reflector and 50% less than with nothing at all, over the first 60 minutes.

Unless otherwise stated, all measurements, values, ratings, positions, magnitudes, sizes, locations, and other specifications which are set forth in this specification, including in the claims which follow, are approximate, not exact. They are intended to have a reasonable range which is consistent with the functions to which they relate and with what is customary in the art to which they pertain.

The foregoing description of the preferred embodiment of the invention has been presented for the purposes of illustration and description. While multiple embodiments are disclosed, still other embodiments of the present invention will become apparent to those skilled in the art from the above detailed description, which shows and describes illustrative embodiments of the invention. As will be realized, the invention is capable of modifications in various obvious aspects, all without departing from the spirit and scope of the present invention. Accordingly, the detailed description is to be regarded as illustrative in nature and not restrictive. Also, although not explicitly recited, one or more embodiments of the invention may be practiced in combination or conjunction with one another. Furthermore, the reference or non-reference to a particular embodiment of the invention shall not be interpreted to limit the scope the invention. It is intended that the scope of the invention not be limited by this detailed description, but by the claims and the equivalents to the claims that are appended hereto.

Except as stated immediately above, nothing which has been stated or illustrated is intended or should be interpreted to cause a dedication of any component, step, feature, object, benefit, advantage, or equivalent to the public, regardless of whether it is or is not recited in the claims.

What is claimed is:

1. An improved vehicle windshield protection device comprising:
   a cover portion;
   two sets of side mirror straps, comprising: a first full side strap; a second full side strap; a first mirror strap; a second mirror strap; a first horizontal strap; and second horizontal strap;
   two support members;
   wherein said cover portion comprises a top end, a bottom end, a first side, and a second side such that there is a first top corner, a second top corner, a first bottom corner, and a second bottom corner;
   wherein said cover portion substantially covers an outer surface of a windshield of a vehicle;
   wherein said two support members are located at said first side and said second side and keep said vehicle windshield protection device covering said windshield of said vehicle;
   wherein said two sets of mirror straps are configured to engage with two side mirrors of said vehicle;
   wherein said first full side strap extends between said first top corner and said first bottom corner;

wherein said second full side strap extends between said second top corner and said second bottom corner;

wherein said first mirror strap extends between spa base of said first full side strap and a first full/mirror connection point;

wherein said second mirror strap extends between a base of said second full side strap and a second full/mirror connection point;

wherein a portion of said first full side strap that is between said base of said first full side strap and said first full/mirror connection point is longer than a length of the first mirror strap;

wherein said first horizontal strap extends from said first side of said cover portion and connects to said first mirror strap; and wherein said second horizontal strap extends from said second side of said cover portion and connects to said second mirror strap.

2. The vehicle windshield protection device of claim 1, further comprising:
one or more security side flaps;
wherein said one or more security side flaps each comprise a security side flap support member;
wherein said one or more security side flaps are configured to engage with an interior of said vehicle;
wherein each of said one or more security side flap support members are connected at a distal end of each of one or more two security side flaps; and
wherein said one or more security side flaps and said one or more security side flap support members prevent said vehicle windshield protection device from being inadvertently removed from said vehicle;
wherein said one or more security side flaps are connected to one or more of said two sides of said cover portion.

3. The vehicle windshield protection device of claim 1, wherein said cover portion comprises an interior Polyvinyl Chloride coating;
wherein said Polyvinyl Chloride coating makes said cover portion remain flexible in temperatures below 0° C.;
wherein said cover portion substantially prevents frost, ice, and snow from adhering to said windshield.

4. The vehicle windshield protection device of claim 1, wherein said cover portion has an exterior reflective coating and substantially prevents sunlight from entering said vehicle through said windshield.

5. The vehicle windshield protection device of claim 3, wherein said cover portion has an exterior reflective coating and substantially prevents sunlight from entering said vehicle through said windshield.

6. The vehicle windshield protection device of claim 1, wherein said cover portion also substantially covers one or more windshield wipers.

7. An improved vehicle windshield protection device comprising:
a cover portion;
two sets of side mirror straps comprising a first set of side mirror straps and a second set of side mirror straps, each set comprising a vertical top strap, a middle strap, a horizontal base strap, a horizontal middle strap, a top connector strap, and a bottom connector strap, such that there is a first and second vertical top strap, a first and second middle strap, a first and second horizontal base strap, a first and second horizontal middle strap, a first and second top connector strap, and a first and second bottom connector strap;
two support members;

wherein said cover portion comprises a top end, a bottom end, a first side, and a second side such that there is a first top corner, a second top corner, a first bottom corner, and a second bottom corner;

wherein said cover portion substantially covers an outer surface of a windshield of a vehicle;

wherein said two support members are located at said first side and said second side and keep said vehicle windshield protection device covering said windshield of said vehicle;

wherein each of said two sets of mirror straps are connected to said first side and said second side of said cover portion respectively; and wherein said two sets of mirror straps are configured to engage with two side mirrors of said vehicle.

8. The vehicle windshield protection device of claim 7, wherein said first vertical top strap, said first top connector strap, said first horizontal base strap, and said first bottom connector strap form a first mid-mirror strap that extends substantially from said first top corner of said cover portion to said first bottom corner of said cover portion;

wherein said second vertical top strap, said second top connector strap, said second horizontal base strap, and second bottom connector strap form a second mid-mirror strap that extends substantially from said second top corner of said cover portion to said second bottom corner of said cover portion;

wherein said first horizontal middle strap connects to said first mid-mirror strap where said first top connector strap meets said first bottom connector strap and connects to a cover strap at a point above said first bottom corner;

wherein said second horizontal middle strap connects to said second mid-mirror strap where said second top connector strap meets said second bottom connector strap and connects to said cover strap at a point above said second bottom corner;

wherein a top end of said first middle strap connects to said first mid-mirror strap above where said first horizontal middle strap connects to said first mid-mirror strap;

wherein a bottom end of said first middle strap connects to said first mid-mirror strap where said first bottom connector strap meets said first horizontal base strap; and wherein a bottom end of said second middle strap connects to said second mid-mirror strap where said second bottom connector strap meets said second horizontal base strap.

9. The vehicle windshield protection device of claim 8, further comprising:
two full side straps, a first full side strap and a second full side strap;
wherein said first full side strap is connected to a first side of said cover portion and extends between said first top corner of said cover portion and said first bottom corner of said cover portion;
wherein said second full side strap is connected to said second side of said cover portion and extends between said second top corner of said cover portion and said second bottom corner of said cover portion.

10. The vehicle windshield protection device of claim 9, further comprising:
one or more security side flaps;
wherein said one or more security side flaps each comprise a security side flap support member;

wherein said one or more security side flaps are configured to engage with an interior of said vehicle;

wherein each of said one or more security side flap support members are connected at a distal end of each of one or more two security side flaps; and wherein said one or more security side flaps and said one or more security side flap support members prevent said vehicle windshield protection device from being inadvertently removed from said vehicle;

wherein said one or more security side flaps are connected to one or more of said two sides of said cover portion.

11. The vehicle windshield protection device of claim 8, wherein said cover portion comprises an interior Polyvinyl Chloride coating;

wherein said Polyvinyl Chloride coating makes said cover portion remain flexible in temperatures below 0° C.;

wherein said cover portion substantially prevents frost, ice, and snow from adhering to said windshield.

12. The vehicle windshield protection device of claim 8, wherein said cover portion has an exterior reflective coating and substantially prevents sunlight from entering said vehicle through said windshield.

13. The vehicle windshield protection device of claim 11, wherein said cover portion has an exterior reflective coating and substantially prevents sunlight from entering said vehicle through said windshield.

14. The vehicle windshield protection device of claim 8, wherein said cover portion also substantially covers one or more windshield wipers.

15. An improved vehicle windshield protection device comprising:
a cover portion;
two sets of side mirror straps comprising a first set of side mirror straps and a second set of side mirror straps, each set comprising a vertical mirror strap and two horizontal straps, a top horizontal strap and a bottom horizontal strap, such that there is a first and second vertical mirror strap, a first and second top horizontal strap, and a first and second bottom horizontal strap;
two support members;
wherein said cover portion comprises a top end, a bottom end, a first side, and a second side such that there is a first top corner, a second top corner, a first bottom corner, and a second bottom corner;
wherein said cover portion substantially covers an outer surface of a windshield of a vehicle;
wherein said two support members are located at said first side and said second side and keep said vehicle windshield protection device covering said windshield of said vehicle; and
wherein said two sets of mirror straps are configured to engage with two side mirrors of said vehicle;
wherein each of said two sets of mirror straps are connected to said first side and said second side of said cover portion respectively.

16. The vehicle windshield protection device of claim 15, wherein said first vertical strap extends substantially from said first top corner of said cover portion to said first bottom corner of said cover portion;

wherein said second vertical strap extends substantially from said second top corner of said cover portion to said second bottom corner of said cover portion;

wherein said first top horizontal strap and said first bottom horizontal are substantially parallel to each other, with said first top horizontal strap above said first bottom horizontal strap;

wherein said second top horizontal strap and said second bottom horizontal are substantially parallel to each other, with said second top horizontal strap above said second bottom horizontal strap;

wherein said first top horizontal strap and said first bottom horizontal strap extend substantially in a horizontal manner from said first side to said first vertical strap; and wherein said second top horizontal strap and said second bottom horizontal strap extend substantially in a horizontal manner from said second side to said second vertical strap.

17. The vehicle windshield protection device of claim 16, further comprising:
two full side straps, a first full side strap and a second full side strap;
wherein said first full side strap is connected to a first side of said cover portion and extends between said first top corner of said cover portion and said first bottom corner of said cover portion;
wherein said second full side strap is connected to said second side of said cover portion and extends between said second top corner of said cover portion and said second bottom corner of said cover portion.

18. The vehicle windshield protection device of claim 17, further comprising:
one or more security side flaps;
wherein said one or more security side flaps each comprise a security side flap support member;
wherein said one or more security side flaps are configured to engage with an interior of said vehicle;
wherein each of said one or more security side flap support members are connected at a distal end of each of one or more two security side flaps; and
wherein said one or more security side flaps and said one or more security side flap support members prevent said vehicle windshield protection device from being inadvertently removed from said vehicle;
wherein said one or more security side flaps are connected to one or more of said two sides of said cover portion.

19. The vehicle windshield protection device of claim 16, wherein said cover portion comprises an interior Polyvinyl Chloride coating;

wherein said Polyvinyl Chloride coating makes said cover portion remain flexible in temperatures below 0° C.;

wherein said cover portion substantially prevents frost, ice, and snow from adhering to said windshield.

20. The vehicle windshield protection device of claim 16, wherein said cover portion has an exterior reflective coating and substantially prevents sunlight from entering said vehicle through said windshield.

21. The vehicle windshield protection device of claim 19, wherein said cover portion has an exterior reflective coating and substantially prevents sunlight from entering said vehicle through said windshield.

22. The vehicle windshield protection device of claim 16, wherein said cover portion also substantially covers one or more windshield wipers.

* * * * *